(12) United States Patent
Choset et al.

(10) Patent No.: US 6,871,563 B2
(45) Date of Patent: Mar. 29, 2005

(54) ORIENTATION PRESERVING ANGULAR SWIVEL JOINT

(76) Inventors: Howie Choset, 401 Amberson Ave., Apt. 211, Pittsburgh, PA (US) 15232; Elie Shammas, 5562 Hobat St., Apt. #604, Pittsburgh, PA (US) 15217

( * ) Notice: Subject to any disclaimer, the term of this patent is extended or adjusted under 35 U.S.C. 154(b) by 0 days.

(21) Appl. No.: 10/083,705

(22) Filed: Feb. 26, 2002

(65) Prior Publication Data

US 2002/0166403 A1 Nov. 14, 2002

Related U.S. Application Data

(60) Provisional application No. 60/271,549, filed on Feb. 26, 2001.

(51) Int. Cl.⁷ .............................................. B25J 17/00
(52) U.S. Cl. .............................. 74/490.05; 74/490.01; 74/490.03; 901/26; 901/28; 901/29
(58) Field of Search ........................ 74/490.01, 490.03, 74/490.05, 490.06, 423; 901/26, 28, 29

(56) References Cited

U.S. PATENT DOCUMENTS

| | | | | |
|---|---|---|---|---|
| 3,315,542 A | * | 4/1967 | Fortin et al. ................... | 901/26 |
| 4,068,536 A | * | 1/1978 | Stackhouse .................. | 901/26 |
| 4,499,784 A | * | 2/1985 | Shum ....................... | 74/490.06 |
| 4,683,406 A | | 7/1987 | Ikeda et al. | |
| 4,703,668 A | * | 11/1987 | Peter ........................ | 74/490.06 |
| 4,841,795 A | * | 6/1989 | Obrietan ...................... | 901/26 |
| 4,854,808 A | * | 8/1989 | Bruno ......................... | 901/26 |
| 4,878,393 A | | 11/1989 | Duta et al. | |
| 4,904,148 A | | 2/1990 | Larsson | |
| 6,026,703 A | | 2/2000 | Stanisic et al. | |

OTHER PUBLICATIONS

H. Choset, J. Luntz, E. Shammas, T. Rached, D. Hull and C. Dent, Diesign and Motion Planning for Serpentine Robots, Tokyo Institute of Technology Super Mechano, Mar. 2–3, 2000.

* cited by examiner

Primary Examiner—David A. Bucci
Assistant Examiner—Bradley J. Van Pelt
(74) Attorney, Agent, or Firm—Frederic Farina; Enrica Bruno

(57) ABSTRACT

An orientation preserving angular swivel joint suitable for mechanical robotic arms and in particular snake robots, the joint comprising two members and an angular bevel gear train that connects the two members of the joint. The gear train allows an actuator to be positioned along the axis of the joint while transferring forces to the periphery of the mechanism, thus creating a high mechanical advantage proportional to the radius of the robot. The gear train is capable of transferring rotational motion between the two members with a constant ratio. Relative rotation between two bays of the joint does not take place, thereby preventing electrical wires running through the body of the snake from being twisted, and thus avoiding failure.

16 Claims, 21 Drawing Sheets

ORIENTATION PRESERVING ANGULAR SWIVEL JOINT

CROSS REFERENCE TO RELATED APPLICATIONS

This application claims the benefit of U.S. Provisional Patent Application No. 60/271,549, filed on Feb. 26, 2001, which is incorporated herein by reference.

STATEMENT AS TO FEDERALLY SPONSORED RESEARCH

The invention described herein was made in the performance of work under a National Academy of Sciences contract (National Cooperative Highway Research Program, contract no.NCHRP-56) and is subject to the provisions of Public Law 96-517 (35 U.S.C. 202). This contract was issued under the Department of Transportation Agreement No. DTFH61-97-X-00001.

BACKGROUND

A conventional revolute or a simple swivel joint is shown in FIG. 1. The conventional joint has one degree-of-freedom, since members 101 and 103 are only allowed to rotate about a single axis 102. An example of a simple swivel joint is the human elbow.

FIG. 2 depicts a conventional double revolute robotic joint, which utilizes two actuators. The bottom actuator orients the bending plane 95 by rotating the whole assembly about axis 91a, and the top actuator bends the top member 92 within that plane by rotating member 92 about axis 92a. This joint has two independent degrees-of-freedom: orienting and bending. Since each degree-of-freedom is actuated by a different motor, the degrees-of-freedom are said to be decoupled. As it would be apparent to a person skilled in the art, the orientation of the top member 92 denoted by vector 94 changes as member 91 is rotated about axis 91a. The type of joint shown in FIG. 2 is not adequate for use in a snake robot because of the relative rotation between members 91 and 92. Moreover, these joints present the disadvantage of being bulky since the top actuator is installed along axis 92a thus enlarging the joint size.

Shown in FIGS. 3a and 3b is a prior art angular swivel joint. This joint is similar to the revolute joint except that the axis 113 of the joint is not perpendicular to either one of axis 111a and axis 114a of members 111 and 114, respectively. Because of this, the axis 114a of the free member 114 defines a cone of revolution 117 as it rotates about axis 113, as shown in FIG. 3b.

FIGS. 4a and 4b depict a conventional double angular swivel joint. This joint has two motors: the bottom motor rotates the whole assembly about axis 111a and the top motor rotates the top part 114 about axis 113. Thus, the top member sweeps a cone 117 as shown in FIG. 4a, and the bottom motor rotates that cone as shown in FIG. 4b. Since there are two actuators, this joint has no more than two degrees-of-freedom, and like the simple double revolute joint described above, the two independent degrees-of-freedom are bending and orienting. Orienting is achieved by actuating the bottom motor. But, in order to achieve bending, the two motors must be actuated simultaneously in such a way that the top member stays in one plane 115. Hence, the bending degree-of-freedom is coupled between two motors. Like in the simple double revolute joint described above, the orientation 118 of the top member changes to 118'" which in not parallel to 118. This means that relative rotation has occurs between the two members, and thus the double angular swivel joint cannot be used as a snake robot joint.

Two degrees-of-freedom joints suitable for snake robots have been the subject of much research. The first generation of designs includes simple double revolute joints connected to one another to form a snake robot. Such designs afford the robot limited capabilities and size. A more advanced design is the actuated universal joint. However, this design has the disadvantage of being bulky and has the problem of twisting. Yet another design uses an angular double swivel joint as a subassembly. This design has irregularity in the universal joint and has a relatively small strength-to-size ratio.

The NEC Corporation snake robot is one of the first designs that use an angular double swivel joint as a subassembly (U.S. Pat. No. 4,683,4061) and is shown in FIGS. 19a and 19b. This design utilizes a relatively large universal joint to prevent any relative twist between the two bays. Nonetheless, this joint is heavy and bulky. Moreover, since the universal joint does not transfer rotational speed between the two members linearly, the joint is difficult to control and the bending speed is not constant.

The prior art also includes the JPL serpentine robot built at NASA's Jet Propulsion Laboratory and the California Institute of Technology shown in FIGS. 20a and 20b. This design is based on the NEC Corporation robotic joint mentioned in the immediately preceding paragraph The JPL serpentine robot is 1.5 inches in diameter, approximately 3 foot long, weights 6 lbs., and has 10 degrees-of-freedom. All joints are direct-drive motor controlled, and all motors are mounted internally. This design also uses a universal joint, which, in contrast with other designs, is mounted inside the robot. Because the joint in mounted inside the robot, the size of the joint is limited and must be relatively small. Moreover in the JPL robot, the universal joint is necessarily hollow in order to run electrical connections through the snake robot. This small and hollow universal joint has the disadvantage of being weak, breaking easily, and exhibiting important backlash and slack.

The Pacific Northwest National Laboratory (PNNL) designed a 14 degrees-of-freedom aim, which differs from the robots descried above in that it does not use the double angular swivel joint as a subassembly. It is shown in FIGS. 21a and 21b. This design uses a simple actuated universal joint similar to the double revolute joint described in FIG. 2. However, this design uses threaded screws to actuate the universal joint making the joint strong but at the cost of being very slow. Additionally, this joint lacks robustness.

With the exception of the joints used in the NEC corporation, JPL and PNNL snake robots described above, two degrees-of-freedom joints of the prior art cannot be used in a snake robot. Because there is relative twisting between the members, electrical connections running along the body of the robot may be severely damaged or destroyed. This relative twisting may be substantially reduced by introducing a third actuator for maintaining constant orientation. However, controlling a third actuator can be very complex and substantially adds to the cost and size of the joint.

What is needed is a swivel joint that utilizes only two actuators to extract two degrees-of-freedom, wherein the joint's orientation is maintained, thus making the joint adequate for use in a snake robot.

Features and Advantages of the Joint Design in Accordance with the Present Invention Compactness The joint in accordance with the present invention has a highly compact design compared to prior art snake robot joint designs, and uses conventional parts (mostly off the shelf) and simple machining. The nominal diameter of the bays is preferably around 1.6 inches and 1.85 inches along the joint. The link or stage length is about 6.5 inches. These dimensions are restricted by the fact that off-the-shelf components are used in a preferred embodiment. However, it will readily appear to a person skilled in the art that a smaller or larger joint may be fabricated according to the particular applications the joint is designed for. In fact, the joint of the present invention could be as small as practicable or as big as necessary. The dimensions disclosed above are for the sole purpose of illustrating a preferred embodiment and are in no way meant to be limiting. Designs which do not use off-the-shelf components will naturally come with a greater cost due to the necessity to machine custom made components.

Strength

An important feature which set the present invention apart from the prior art is the use of angular bevel gears. These gears mate on the periphery of the joint diameter, and thus are capable of transmitting high forces and withstanding high torques. Moreover, bearings are preferably chosen to withstand very high loads, preferably up to 15 Newton-Meter torque or more depending on the application, and are preferably positioned such that they accommodate most high forces which the joint is subjected to and diminish these forces before transmitting them to the gears. In fact, the bearings take all the forces and torques that the joint faces, and the gears are only responsible for preventing relative twisting between the bays, which is a relatively minimal load. Additionally, the present joint has a high overall mechanical advantage, which allows the use of small motors and low torques. This prevents the need for expensive custom made motors. This strength of the joint is critical in all kinds of self-locomotion, climbing, shoring and other applications. In a preferred embodiment, the joint is capable of lifting up about half of the entire robot off the ground. For example, in a snake robot formed of 11 bays, the joint is capable of lifting up 6 bays. Naturally, a snake robot in accordance with the present invention may comprise as many bays as necessary.

Rolling Capability

The joint of the present invention has an additional degree-of-freedom compared to prior art snake robot joints. When the joint is in the straight position, the upper and lower cups form a circular profile. With the gear train, the upper and lower cups can be rotated as one rigid body, and the gear train can thus be used as a wheel which may be utilized to create a third degree-of-freedom. The only constraint for this added feature is that the joint be in the straight position. Therefore, this added feature is preferably only used on relatively smooth straight surfaces. In accordance with this invention, by only using two actuators, "two plus one" degrees-of-freedom can be extracted. It is to be noted, that the present joint does not have three degrees-of-freedom in the strict definition of the term, since the third degree-of-freedom is only available in the special case where the joint is in the straight position.

Reachability

A unique feature the joint of the present invention its reachability. The present invention joint has a reachability of 180 degrees. Such reachability has not been achieved in the prior art. The present joint can bend by 90 degrees in each direction, so the range of first degree-of-freedom goes from −90 to +90 degrees. The range of the second degree-of-freedom goes from 0 to 360 degrees. Thus, fixing one bay, the second bay can reach any point on a complete hemisphere as shown in FIG. 22. Moreover, since the joint has a hollow assembly and further there is no relative twisting between the bays, the snake can move from one configuration to another, smoothly, quickly and efficiently, without the need to reset the joint to the straight position as is the case with many prior designs.

Flexibility

Another unique aspect of the joint of the present invention is its flexibility. Unlike prior art two is degrees-of freedom joints, the present joint has infinite flexibility as illustrated in FIG. 22. This means that starting from any point on the hemisphere the free end can start moving in any arbitrary direction. In other words the tangent space of the free arm is a plane which is tangent to the hemisphere. This feature is particularly important in snake robot design, since it allows the snake to move "directly" from any configuration to another (using the shortest path) in minimal time and with minimal power consumption. This feature is also particularly important for applications where the robot is restricted to least interference with the environment.

Hollow Shaft Assembly

In a snake robot built with a plurality of joints in accordance with a preferred embodiment of the present invention, a hole with a diameter of about preferably 0.1 to 0.5 inch, most preferably 0.3 inch, goes through the entire length of the body of the snake. Smaller and larger diameters may also be appropriate as well as hole having, any appropriate shape know in the art. This is critical to snake robot design, since it allows to run electrical connections inside the snake, and these electrical connections are protected from the external environment. For example, one of many applications of a snake robot is search and rescue operation in collapsed buildings (e.g., after an earthquake) where a harsh, rough and dirty environment awaits the robot. Moreover, the hollow shaft can receive and protect other needed connections, such as, for example, optical fibers.

Orientation Preserving

In the present design, the bays bend in the desired configuration without any relative twist between the bays. This is critical for running wires through the inside of the snake without risking to damage the wires. In this manner, wires only bend, but would not twist, which is mechanically safe for electrical wires. Thus, a snake robot in accordance with the present invention may go from a given configuration to another very quickly and smoothly without any concern for mechanical failure of the wires. In other words the motors can be continuously actuated for any desired mode of motion, such as bending or orienting or any other mode. In particular we can actuate our joint to be in orientating mode when it is in the straight position. In this case (straight position) a third degree-of-freedom is available: rolling. Thus, the present novel mechanism is able to produce three modes of motion with a simple controller, such as, but not limited to, a simple on/off switch. The controller's functions only need to be as simple as actuating the motors with the same speed but with equal or different orientations. The joint can be actuated by simply turning the motors on or off, and no complicated controller to continuously vary the speed of the motors is needed.

Linear Control

In a preferred embodiment of the present invention, there is a linear relation between the motor speed and the azimuth and elevation angles. Thus, a simple linear controller may be used. The motors are preferably run in a continuous linear mode in order to produce continuous smooth bending and orientation. This is due to an angular bevel mechanism, which provides continuous motion between the bays. In contrast, the universal joint mechanisms of the prior art have a non-constant motion transfer, which leads to complex control and non-smooth behavior or the joint.

SUMMARY

It is an object of this invention to provide a joint assembly, which is suitable for building snake robots. Joints of the present invention may be connected to other joints of the present invention to form a snake robot. The snake robot may also comprise a number of motors to actuate the joints and impart motion on the snake robot and/or configure the snake robot in the desired configuration or shape.

It is another object of this invention to provide a joint, which is light, compact, strong and easily controllable. It is yet another object of this invention to provide a joint, which can be used in all kinds of mechanical robotic arms.

The joint in accordance with the present invention comprises two members and an angular bevel gear train that connects the two members of the joint. The gear train allows an actuator to be positioned along the axis of the joint while transferring forces to the periphery of the mechanism, thus creating a high mechanical advantage proportional to the radius of the robot. The gear train also minimizes the stresses and torques on the joint components. The joint is capable of producing high forces and resisting high loads, both being critical aspects of many snake robot applications. Preferably, the joint may produce a torque as high as about 5 Newton-Meters or higher with a safety factor of 2, and thus can preferably resist forces of the same order of magnitude. As the skilled person will appreciate, these values will depend on the particular application of the joint, and accordingly, a wide range of values, higher or lower are also appropriate. Moreover, the gear train is capable of transferring rotational motion between the two members with a constant ratio. This constant ratio renders the joint easy to control and simplifies the inverse kinematics of the joint. Indeed, for any configuration of the joint, the motor rotations needed to obtain that configuration can be easily be calculated and implemented.

It is another object of this invention to provide a joint with a hollow assembly that allows electrical wires and circuitry to run inside the joint, thus protecting the wires from harsh environmental conditions in which the joint may be placed.

It is a further object to provide a joint that does not allow relative rotation between the two bays connected to the joint, thereby preventing the electrical wires from being twisted, and thus avoiding failure.

It is another object of this invention to provide a joint which is easy to build and which uses off the shelf elements except for a limited number of elements which are preferably machined.

DETAILED DESCRIPTION

Figure 5A:
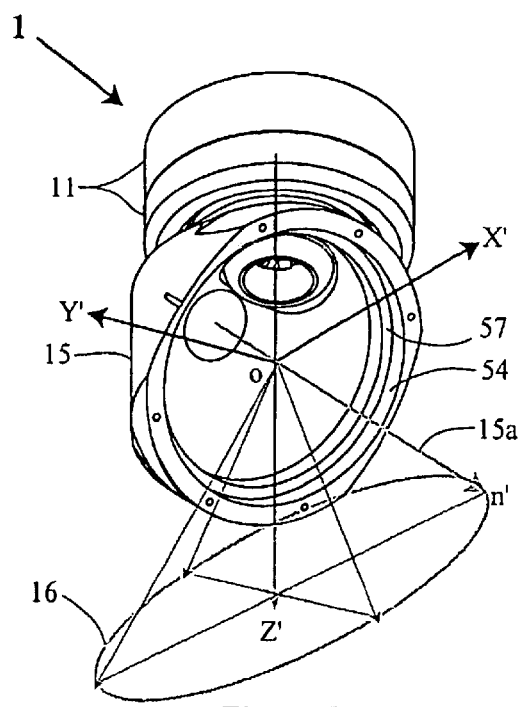
FIGS. 5a and 5b show the upper half subassembly of a joint in accordance with a preferred embodiment of the present invention.
Figure 5B:
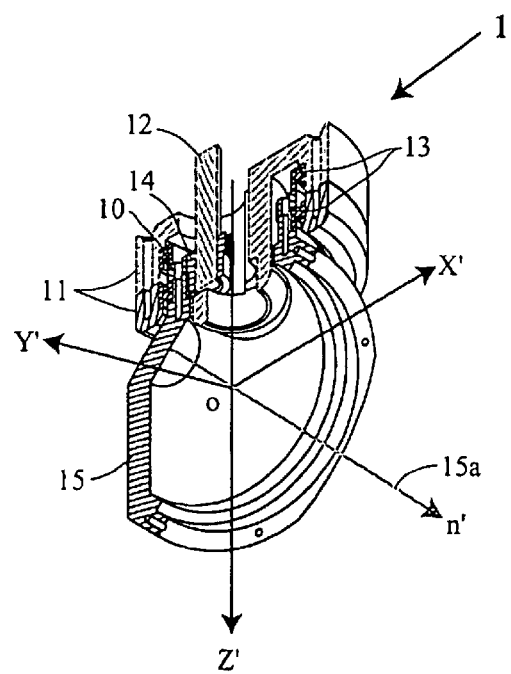

Turning to FIGS. 5a and 5b, the upper half subassembly 1 of the joint is shown. First bay 11 is coupled to obliquely cut upper cup 15 by first and second upper angular bearings 13. Bearings 13 allow upper cup 15 to rotate freely about axis OZ' with respect to first bay 111 with minimal friction. Additionally, bearings 13 hold upper spur ear 10 into position as spur ear 10 is sandwiched between the two bearings 13, upper spur ear 10 being fixedly mounted on upper cup 15. Preferably, two bearings 13 are used to ensure free rotation of upper cup 15 about axis OZ' with no or very minimal wobbling. Upper cup 15 and upper spur pinion gear 10 are preferably bolted together, preferably using a circular array of bolts. However, other ways known in the art of fixedly mounting, two elements may be used as well (e.g., welding). Thus, upper cup 15 and upper spur gear 10 may rotate as one rigid body. Bolting together the upper cup15 and upper spur gear 10 has the advantage that the two elements may be disassembled. Upper spur pinion gear 14 is mounted on upper motor shaft 12 and mates with upper spur gear 10. Upper spur pinion gear 14 is fixedly connected to upper motor shaft 12 preferably via a setscrew, or alternatively using a spline. The upper motor housing (not shown) is preferably connected to first bay 111. In this manner the upper motor (not shown) rotates the upper cup 15 freely around axis OZ', and axis15a prescribes a cone of revolution 16 upon rotation about axis OZ'. The rotation about axis OZ' of upper cup 15 with respect to first bay 111, is carried out by actuating the upper motor to rotate upper motor shaft 12 about the axis of the shaft 12, which in turn rotates upper spur pinion gear 14 fixedly mounted on upper motor shaft 12. Since upper spur pinion gear 14 mates with upper spur gear 10, and is rotatably coupled thereto, the rotation of upper spur pinion gear 14 drives upper spur gear 10 to rotate about axis OZ', thereby rotating upper cup 15 with respect to first bay 11.

Figure 6A:
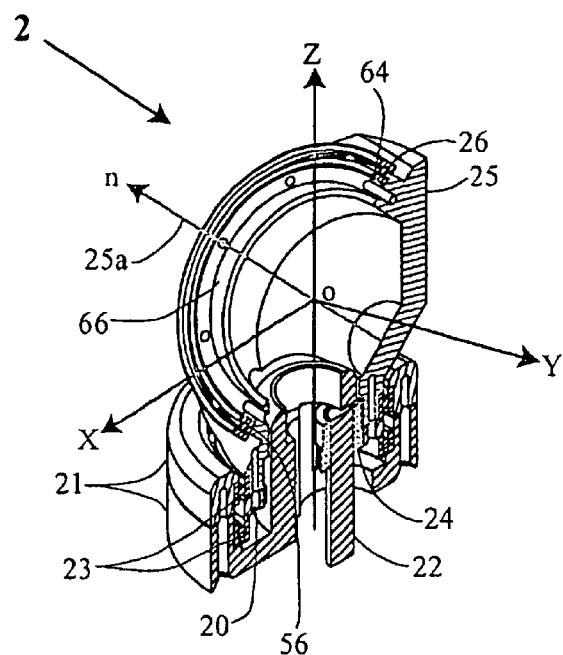
FIGS. 6a and 6b show the upper lower subassembly of a joint in accordance with a preferred embodiment of the present invention.
Figure 6B:
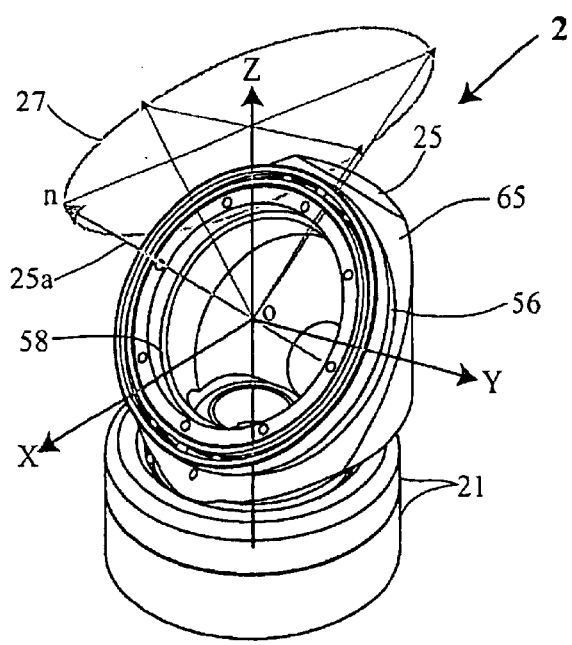

The lower half subassembly 2 of the joint is shown in FIGS. 6a and 6b. The elements included in lower half subassembly 2 are preferably identical to the elements included in the upper half subassembly 1, except for lower cup 25 which differs from upper cup 15 in that part of the lower cup 25 is made to fit within part of the upper cup 15 as explained below. Thus, the description of the upper half subassembly 1 given in the immediately preceding paragraph applies, mutatis mutandis, to the lower half subassembly 2. In particular, in the above description the reader will substitute first bay 11, upper cup 15, upper angular bearings 13, upper spur gear 10, upper spur pinion gear 14, upper motor shaft 12, upper motor housing, upper motor, axis OZ', axis 15a, and cone of revolution 16, with second bay 21, lower cup 25, lower angular bearings 23, lower spur ear 20, lower spur pinion ear 4, lower motor shaft 22, lower motor housing, lower motor, axis OZ, axis 25a, and cone of revolution 27, respectively.

Figure 7A:
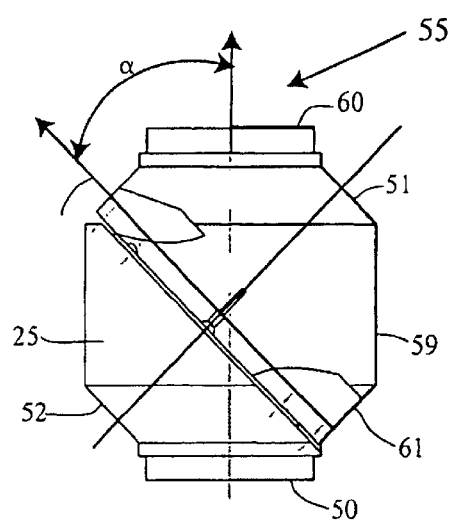
FIGS. 7a and 7b show the upper and lower cup of a joint in accordance with a preferred embodiment of the present invention.
Figure 7B:
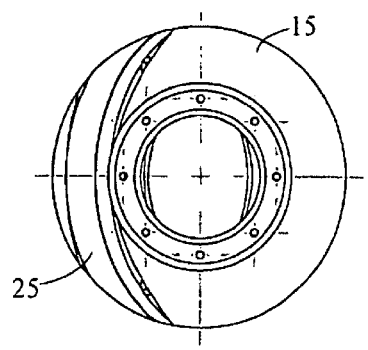

Preferably, the upper cup 15 and the lower cup 25 are fabricated from a generally cylindrical body 55 as shown in FIGS. 7a and 7b. Body 55 has a major cylindrical portion 59 ending, on the upper side, with upper conical portion 51 and upper minor cylindrical portion 60, and, on the lower side, with the lower conical portion 52 and lower minor cylindrical portion 61. As shown in FIG. 7b, body 55 has a hollow interior and a circular cross-section, and both the upper and lower conical portions 51 and 52 also have a circular cross-section. The wall of body 55 has a thickness preferably ranging from about 0.1 inches to about 0.25 inches. This thickness may vary depending upon the design requirements for different applications of the joint. Upper cup 15 and lower cup 25 are preferably manufactured using a lathe with two different milling angles. The outside profile is shaped as shown in FIG. 7a, and then cut along plane 53. Milling of the inside is done on each of the two parts separately. The axis of milling the inside is perpendicular to plane 53.

Upper cup 15 and lower cup 25 are obtained by cutting body 55 along plane 53, which plane 53 intersects the axis of revolution of body 55 at an angle α=45°. Each of the halves of body 55 thus obtained are then machined to create upper cup 15 and lower cup 25. As seen in FIGS. 5a, 5b, 9a and 9b, upper cup 15 is machined so as to create upper cup internal circular flange 54 and upper cup internal circular ledge 57. Lower cup 25 is machined so as to create lower cup internal circular flange 66, lower cup internal circular ledge 58, lower cup first external circular flange 64, lower cup first external circular ledge 63, lower cup second external circular flange 56 and lower cup second external ledge 65. When the joint is assembled as shown in FIG. 9b, upper cup 15 and lower cup 25 are coupled via inter-cup bearing 26, lower cup first external circular flange 64 receives the inside ring of inter-cup bearing 26 and is fixedly connected thereto, while upper-cup internal circular flange 54 receives the outside ring of inter-cup bearing 96 and is fixedly coupled thereto. Further, the outer ring of inter-cup bearing 26 rests on upper cup internal ledge 57, and the inner ring of inter-cup bearing 26 rests on lower cup first external ledge 63. In this manner, bearing 26 allows upper cup 15 and lower cup 25 to rotate with respect to one another. During coupling of upper cup 15 and lower cup 25, axes 15a (On') and 25a (On) are aligned in such a way that the two axes are anti-parallel. This allows the upper subassembly 1 and lower subassembly 2 to rotate freely about axes 15a (or 25a).

Since the upper half subassembly 1 and the lower half subassembly 2 are identical but for upper cup 15 and lower cup 25, identical elements may be used to construct both the upper and lower half subassemblies of the joint. This greatly simplifies the manufacturing of the joint elements and reduces the cost of the joint.

Figure 8:
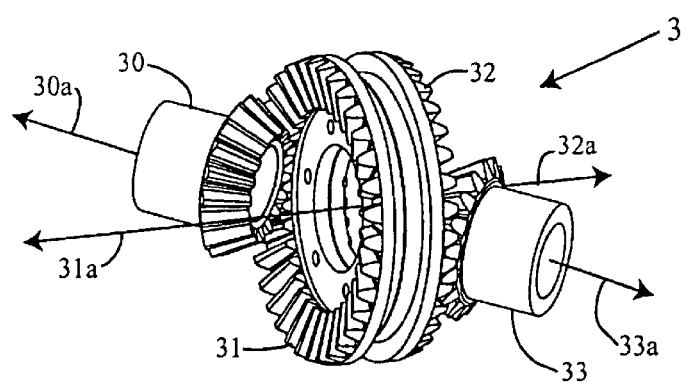
FIG. 8 shows and angular bevel gear train of a joint in accordance with a preferred embodiment of the present invention.

First bay 11 is then connected to second bay 21 by introducing angular bevel gear train 3, as shown in FIG. 8. This assures that the first and second bays are connected via a smooth, strong and compact gear train. Bevel gear train 3 has a constant velocity transfer, which prevents irregularity and hence affords the joint a constant bending velocity. Bevel gear train 3 comprises first bevel pinion 30 coupled to first bevel gear 31, bevel gear bearing 34 connected on one side to first bevel gear 31 and on the other side to second bevel gear 32, and second bevel pinion 33.

Figure 10:
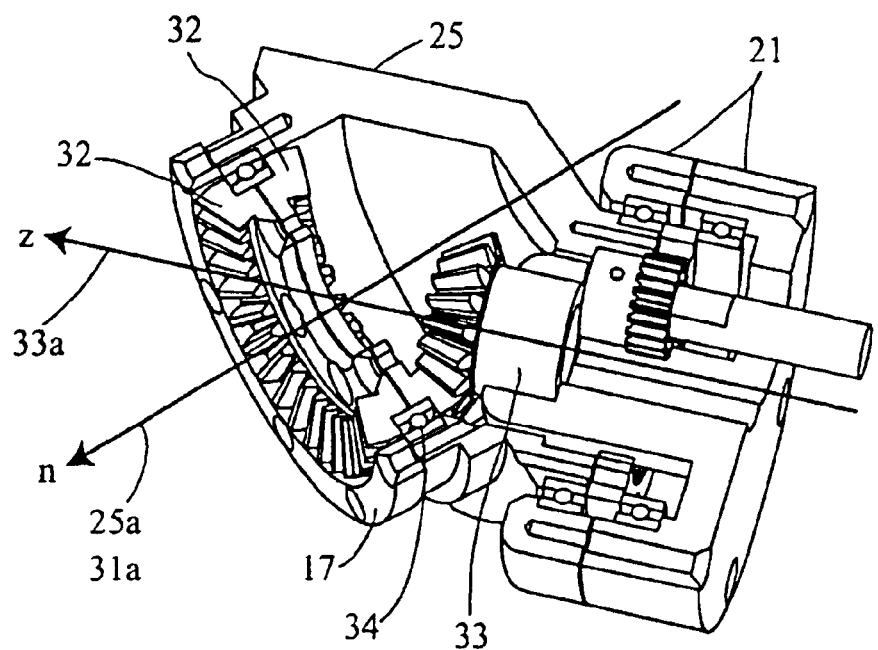
FIG. 10 shows how the bevel gear train connects to the lower half subassembly of a joint in accordance with a preferred embodiment of the present invention.

FIG. 10 shows how bevel gear train 3 connects to the lower half subassembly 2 of the joint. Bevel pinion 33 is fixedly connected to second bay 21. The first and second bevel gears 31 and 32 are bolted together and squeeze the inner ring of bearing 34 between them. The outer ring of bearing 34 is fixedly connected to lower cup 25, preferably by being clamped thereto. The outer ring of bearing 34 mates lower cup internal circular flange 66 and in squeezed between lower cup internal circular ledge 58 and second retaining ring 17. In this manner, axis 25a (On) of lower cup 25 is aligned with axis 31a of first bevel gear 31. As described in connection with FIG. 6b, axis 25a (On) prescribes a cone of revolution 27 as lower cup 25 is rotated, therefore, axis 31a prescribes the same cone of revolution 27 as lower cup 25 is rotated.

Figure 11A:
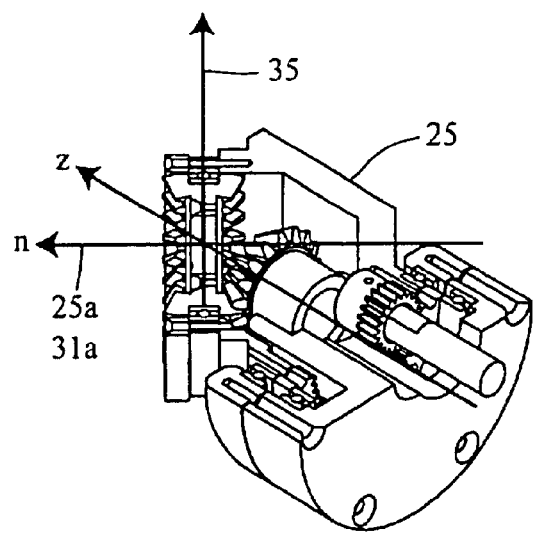
FIGS. 11a and 11b illustrate the motion of the angular bevel gear train as the lower cup is rotated.
Figure 11B:
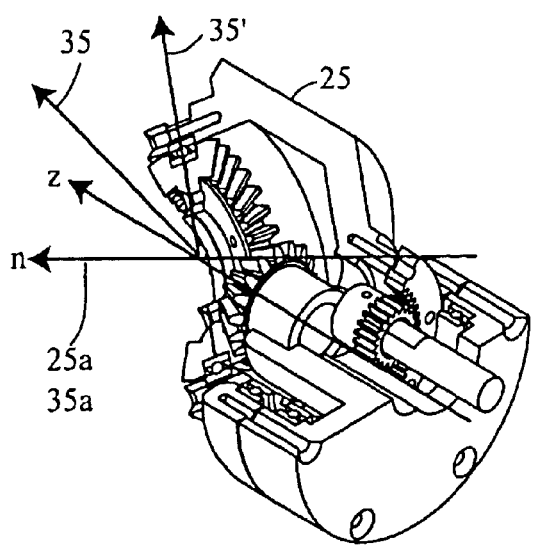

FIGS. 11a and 11b show how bevel gear train 3 acts as lower cup 25 is rotated about axis OZ. As the motor rotates lower cup 25, axis On (25a, 31a) start traversing cone of revolution 27, as described in FIG. 6b. Consequently, the mating point of second bevel gear 32 goes around bevel pinion 33. Thus, in order to have nearly perfect or at least efficient mating between gears, first and second bevel gears 31 and 32 must rotate about axis On [25a, 31a]. After rotating lower cup 25, vector 35 in FIG. 11a becomes vector 35' in FIG. 11b. This rotation is made possible by bearing 34, seen in FIGS. 8 and 9, which allows first and second bevel gears 31 and 32 to rotate freely around axis On.

Figure 9A:
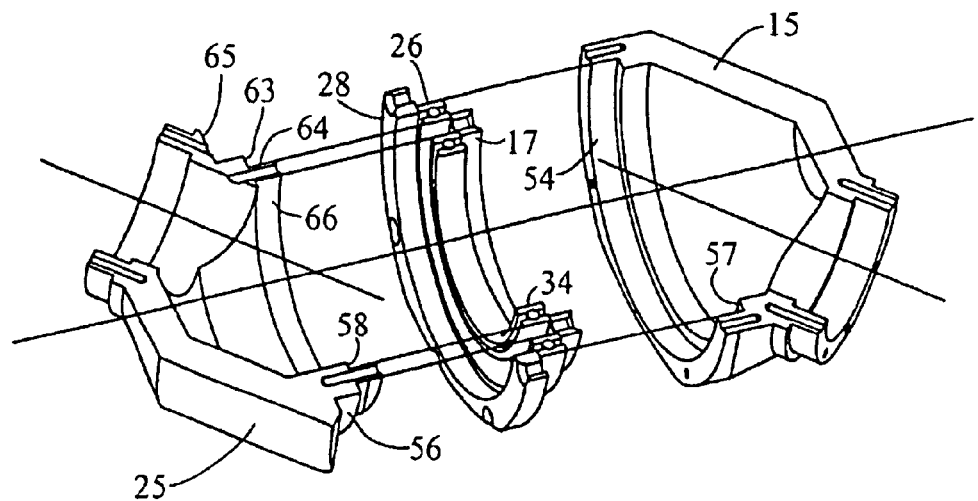
FIGS. 9a and 9b illustrates the assembly of the upper and lower cups of a joint in accordance with a preferred embodiment of the present invention.
Figure 9B:
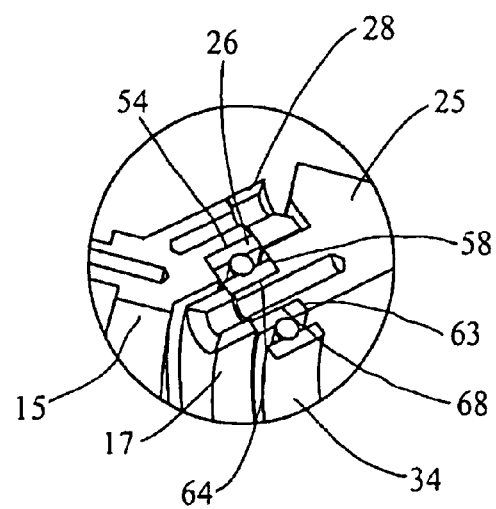
Figure 12:
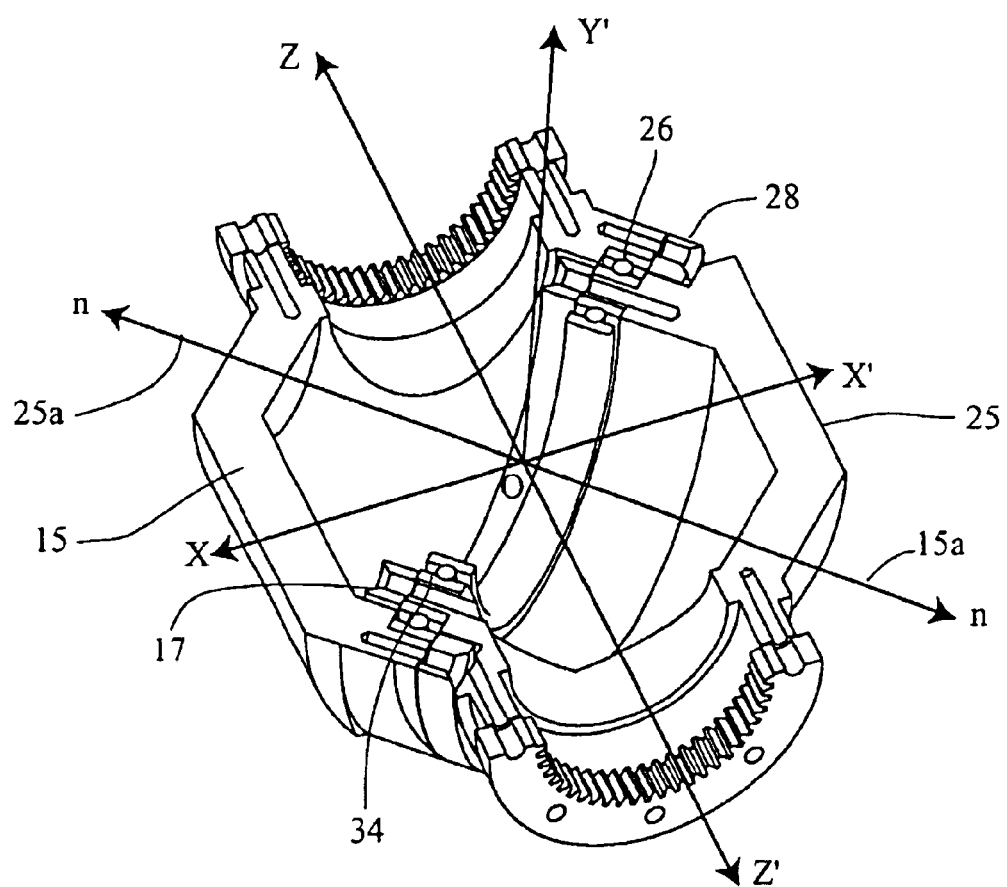
FIG. 12 is a perspective view of the upper and lower cups illustrating how they are connected in accordance with a preferred embodiment of the present invention.

As described in the foregoing, upper cup 15 and lower cup 25 are connected by inserting bearing 26 between the two cups as shown in FIGS. 9a, 9b and 12. In particular, the outer ring of bearing 26 is pressed against upper cup internal flange 54 of upper cup 15 to ensure that bearing 26 stays in place. This is preferably realized by bolting first retaining ring 28 to upper cup 15 such that the outer ring of bearing 26 is squeezed between upper cup internal ledge 57 and first retaining ring 28. The inner ring of bearing 26 is pressed against lower cup first external flange 64 of lower cup 25.

This is preferably realized by bolting second retaining ring 17 to lower cup 25 such that the inner ring of bearing 26 is squeezed between lower cup first external ledge 63 and second retaining ring 17. Second retaining ring 17 also presses the outer ring of bearing 34 against lower cup internal ledge 58 of lower cup 25.

Figure 1:
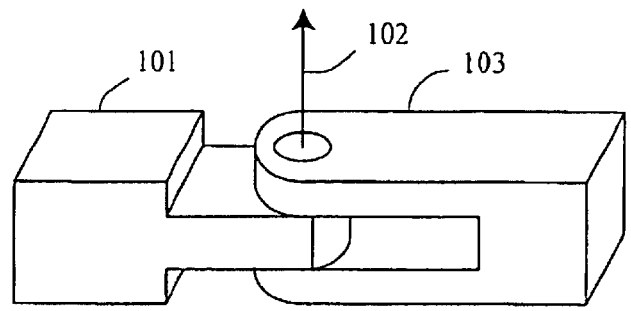
FIG. 1 shows a conventional simple swivel joint.
Figure 2:
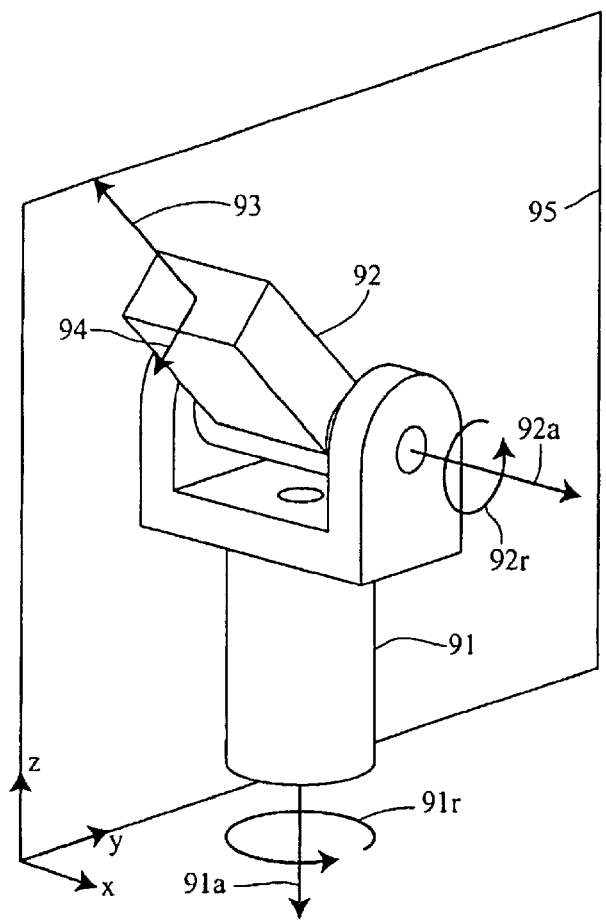
FIG. 2 shows a conventional double swivel joint.
Figure 3A:
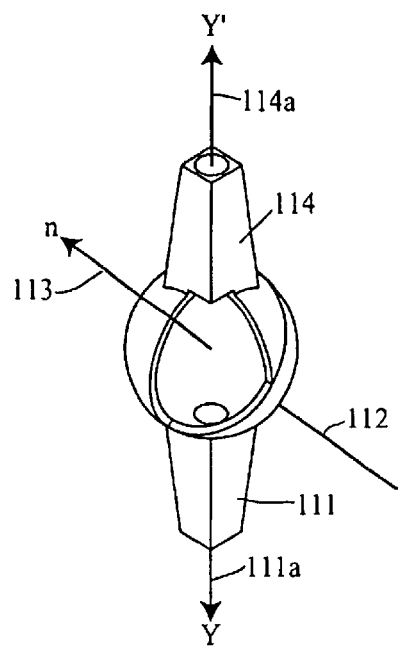
FIGS. 3a, 3b, 4a and 4b depict a conventional angular swivel joint.
Figure 3B:
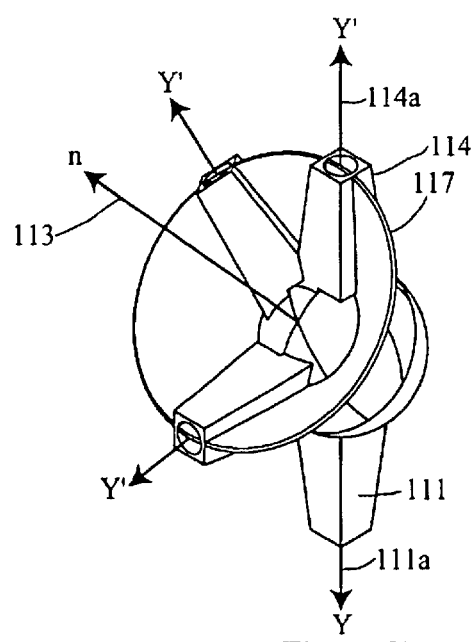
Figure 4A:
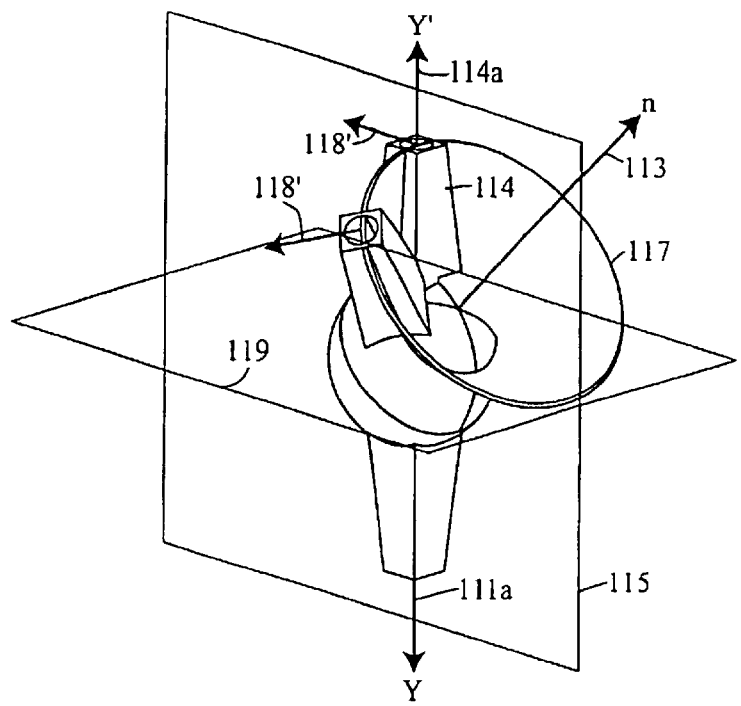
Figure 4B:
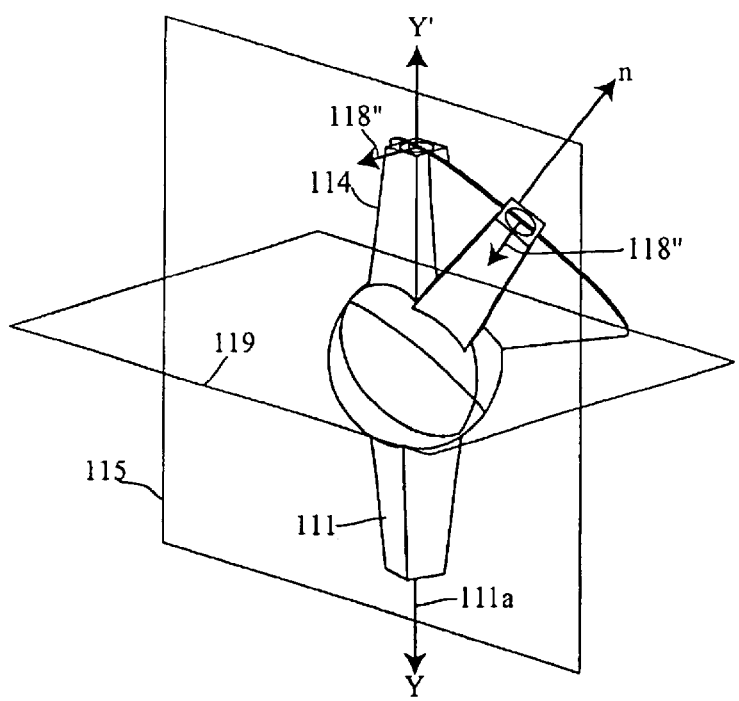
Figure 13:
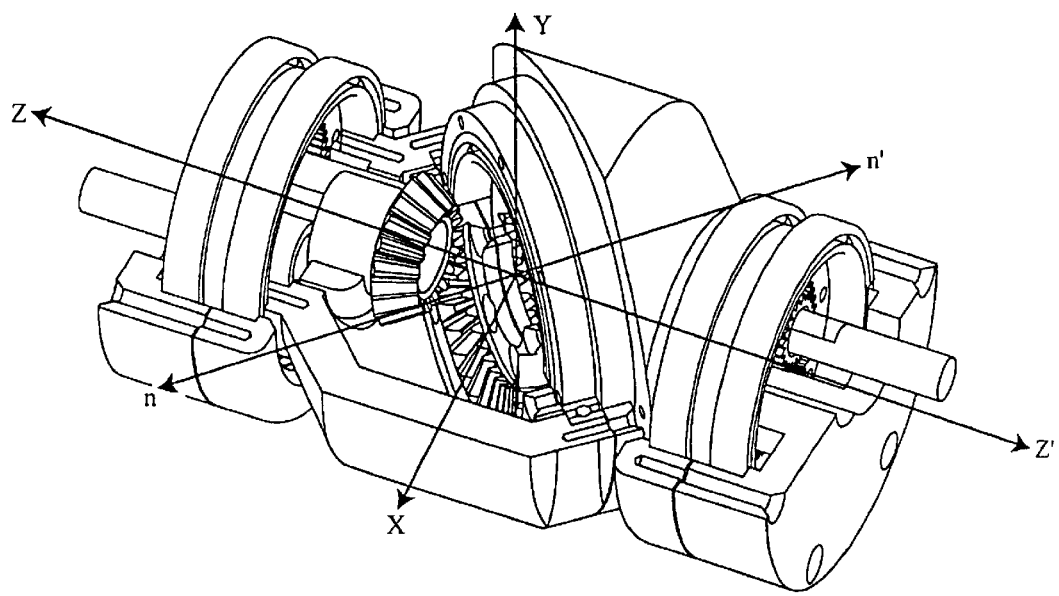
FIG. 13 is a perspective view of a portion of a joint in accordance with a preferred embodiment of the present invention.

FIG. 13 shows a preferred embodiment of a joint in accordance with the present invention with all the components in place. This joint has two decoupled degrees of freedom; hence it can behave as a double revolute joint such as described in FIG. 2, and, in addition, it has the property of maintaining the orientation of the second member.

Figure 24:
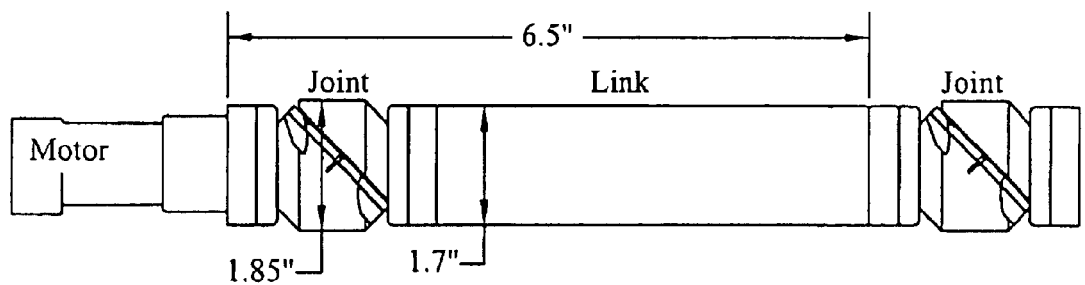
FIG. 24 is a schematic showing the dimension of an embodiment of a joint in accordance with the present invention.

First bay 11, second bay 21, upper cup 15, lower cup 25, first retaining ring 28 and second retaining ring 17 are preferably machined from materials with both high strength and low density in order to make the joint both strong and light weight. A preferred material is aluminum, but other adequate materials will suggest themselves to a person skilled in the art. The other elements such of the joint such as bearings and gears are preferably off-the-shelf elements. Of course, these elements may be machined as well, for applications which require joints of a different size from the joint shown in FIG. 24 (dimensions are shown in inches).

Figure 25:
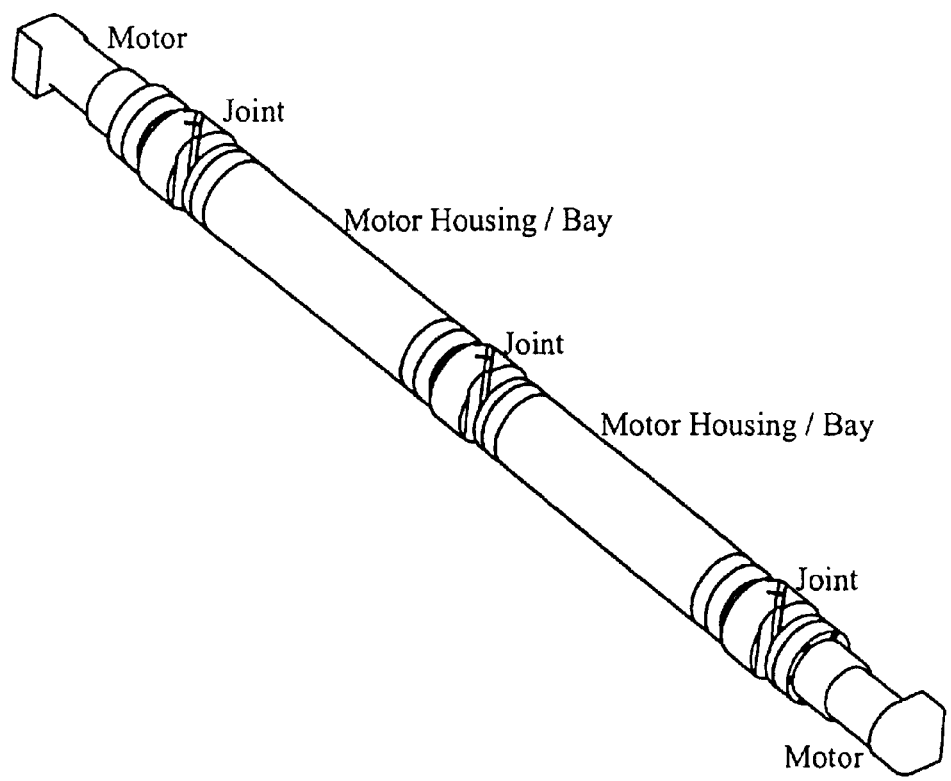
FIG. 25 shows a snake robot built with joints of the present invention.

FIG. 25 shows a snake robot in accordance with the present invention, wherein a plurality of joints is used to form a snake robot. Preferably, each joint is connected to the next joint by connecting together one of their respective bays as show in FIG. 25. The number of joints used will determine the length of the snake robot, which will vary with the application the snake robot is designed for. Motors which actuate the joints of the robot are housed in the bays. Preferably, two motors are used to actuate each joint. The snake robot is placed in the desired configuration by actuating the pertinent joints. The Kinematics of the joint is described below.

Kinematics of the Joint

Figure 14:
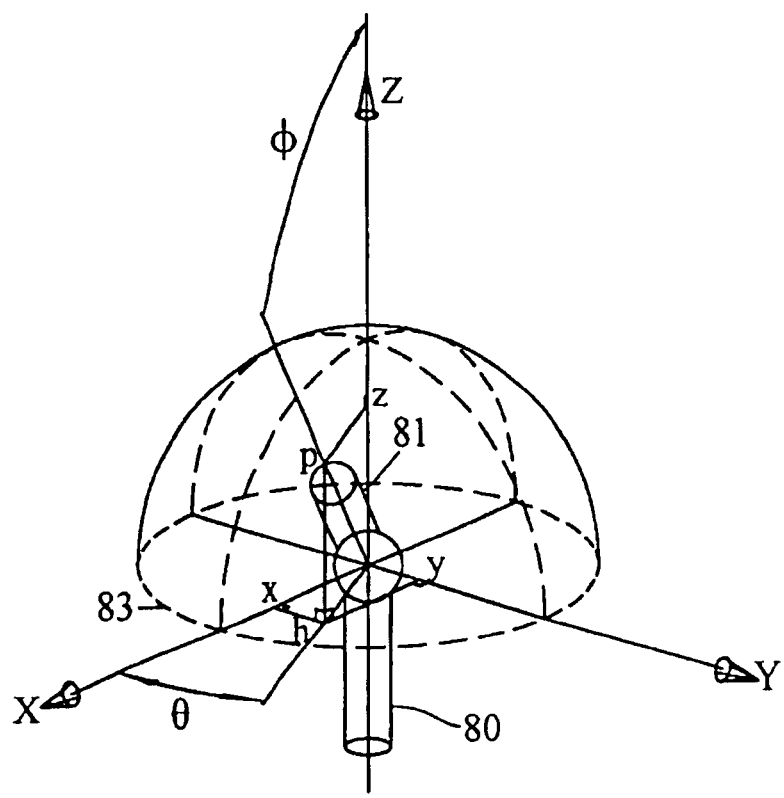
FIG. 14 illustrates the kinematics of a joint in accordance with a preferred embodiment of the present invention.

In this section, we will study the kinematics of our joint. By the end of this section we will have a result that relates the motors rotations to the final configuration of the free end of the snake. Now we will clear some concepts in order to help understanding the figures in this section. Referring to FIG. 14, assume that the lower member [80] of the joint is fixed. Then a point [p] on the free member [81] traverses the hemisphere [83]. Let vector V' represent the upper free end. So for any configuration of the joint, we can project point [p] on the [oXYZ] axes and get the components of V'. Let [x], [y] and [z] be the projections of point [p] on the axes [oX], [oY] and [oZ] respectively. The elevation angle is the angle that the free end makes with the [oZ] axis, and it is donated by [φ], i.e.

$$\cos(\phi) = \frac{oz}{op}.$$

The azimuth angle is the angle that the [oh], the projection of [op] on the [XoY] plane, makes with [oX], and it is denoted by [θ], i.e.

$$\tan(\theta) = \frac{oy}{ox}.$$

Figure 15A:
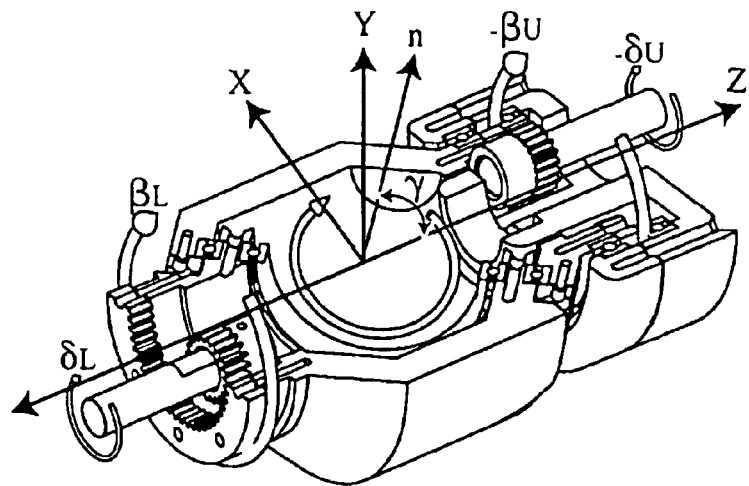
FIGS. 15a and 15b show a perspective view of a joint in accordance with a preferred embodiment of the present invention, illustrating the kinematics of the joint.
Figure 15B:
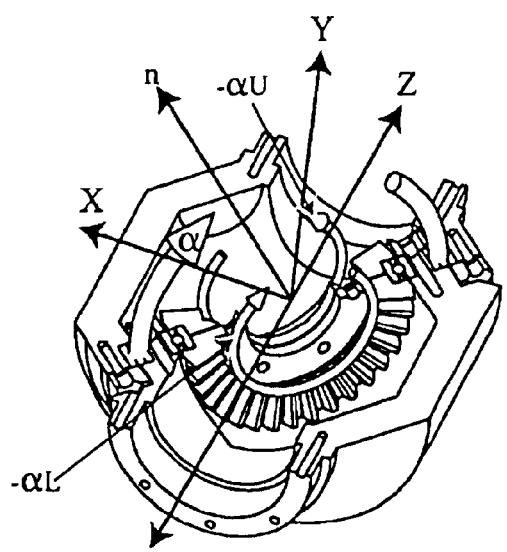

FIGS. 15a and 15b annotate the angles of the joint. $[\delta_L]$ and $[\delta_U]$ denote the angle of rotation of the lower motor and the upper motor respectively. $[\beta_L]$ and $[\beta_U]$ denote the angle or rotation with respect to the lower and upper cups respectively. We have $\delta = K_1 \cdot \beta$ where $K_1$ is the gear ratio between the motor shaft and the cups. In our case $K_1=2.5$. $[\alpha_L]$ and $[\alpha_U]$ denote the angle of rotation that the bevel gear rotates with respect to the lower and upper cup respectively. $[\alpha]$ is the angle of rotation between the two cups. From FIG. 15b $\alpha = \alpha_L + \alpha_U$. But since the gear ratio between the bevel gears is one, then $\alpha = \beta$.

Figure 16A:
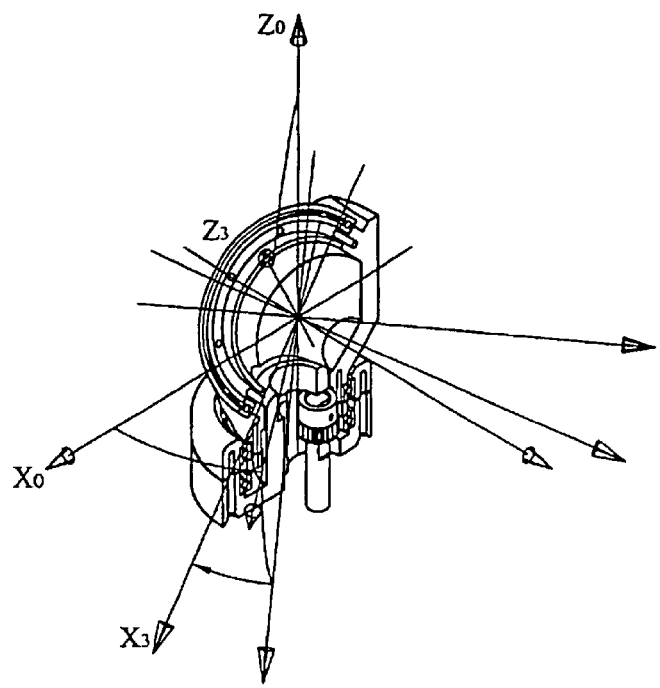
FIGS. 16a and 16b illustrates the kinematics of the lower half subassembly of a joint in accordance with a preferred embodiment of the present invention.
Figure 16B:
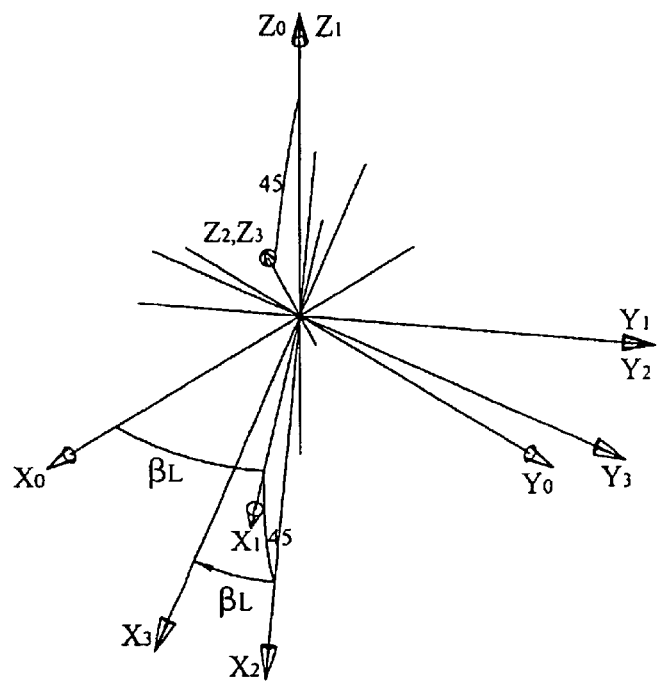

FIGS. 16a and 16b depict a kinematics diagram of the lower part of the joint. It is drawn with four set of reference frames. The frames transfer the coordinate system from the lower bay to the bevel gear in the middle of the joint. To find this transformation matrix $T_{Lower}^{Bevel}$, one must find the intermediate matrices between the intermediate frames. The origins of all the frames coincide. Frame $ox_0y_0z_0$ is attached to the lower bay. Frames $ox_1y_1z_1$ and $ox_2y_2z_2$ are attached to the lower cup. Frame $ox_3y_3z_3$ is attached to the bevel gear. $T_0^1$ transforms frame $ox_0y_0z_0$ to frame $ox_1y_1z_1$ after rotating around $oz_0$ by $\beta_L$ degrees. $T_1^2$ transforms frame $ox_1y_1z_1$ to frame $ox_2y_2z_2$ after rotating around $oy_1$ by 45 degrees. $T_2^3$ transforms frame $ox_2y_2z_2$ to frame $ox_3y_3z_3$ after rotating around $oz_2$ by $-\beta_L$ degrees.

Then:

$$T_0^1 = \begin{bmatrix} \cos(\beta_L) & \sin(\beta_L) & 0 \\ -\sin(\beta_L) & \cos(\beta_L) & 0 \\ 0 & 0 & 1 \end{bmatrix} \quad T_1^2 = \begin{bmatrix} \cos(45) & 0 & -\sin(45) \\ 0 & 1 & 0 \\ \sin(45) & 0 & \cos(45) \end{bmatrix} \quad T_2^3 = \begin{bmatrix} \cos\left(\frac{\beta_L}{2}\right) & \sin\left(\frac{\beta_L}{2}\right) & 0 \\ -\sin\left(\frac{\beta_L}{2}\right) & \cos\left(\frac{\beta_L}{2}\right) & 0 \\ 0 & 0 & 1 \end{bmatrix}$$

Hence: $T_{Lower}^{Bevel} = T_0^3 = T_2^3 \cdot T_1^2$.

$$T_0^1 = \begin{bmatrix} \frac{\cos^2(\beta_L)}{\sqrt{2}} + \sin^2(\beta_L) & \frac{\cos(\beta_L)\sin(\beta_L)}{\sqrt{2}} - \sin(\beta_L)\cos(\beta_L) & -\frac{\cos(\beta_L)}{\sqrt{2}} \\ \frac{\sin(\beta_L)\cos(\beta_L)}{\sqrt{2}} - \cos(\beta_L)\sin(\beta_L) & \frac{\sin^2(\beta_L)}{\sqrt{2}} + \cos^2(\beta_L) & -\frac{\sin(\beta_L)}{\sqrt{2}} \\ \frac{\cos(\beta_L)}{\sqrt{2}} & \frac{\sin(\beta_L)}{\sqrt{2}} & \frac{1}{\sqrt{2}} \end{bmatrix}$$

Figure 17A:
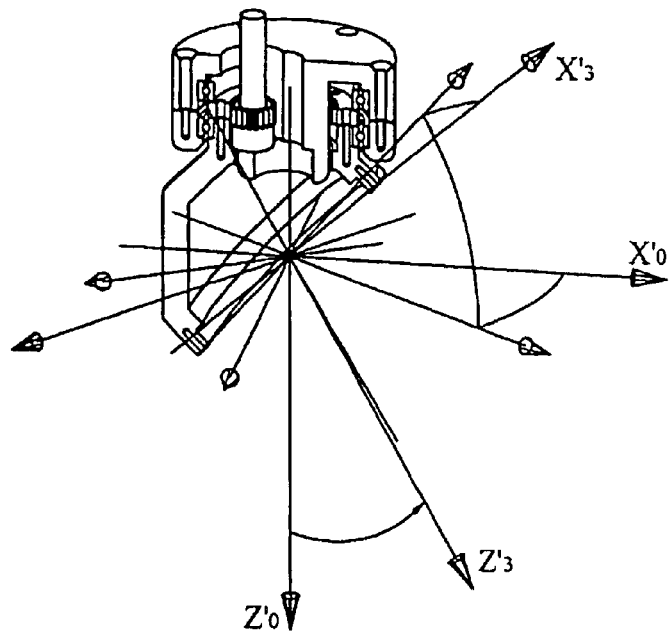
FIGS. 17a and 17b illustrates the kinematics of the upper half subassembly of a joint in accordance with a preferred embodiment of the present invention.
Figure 17B:
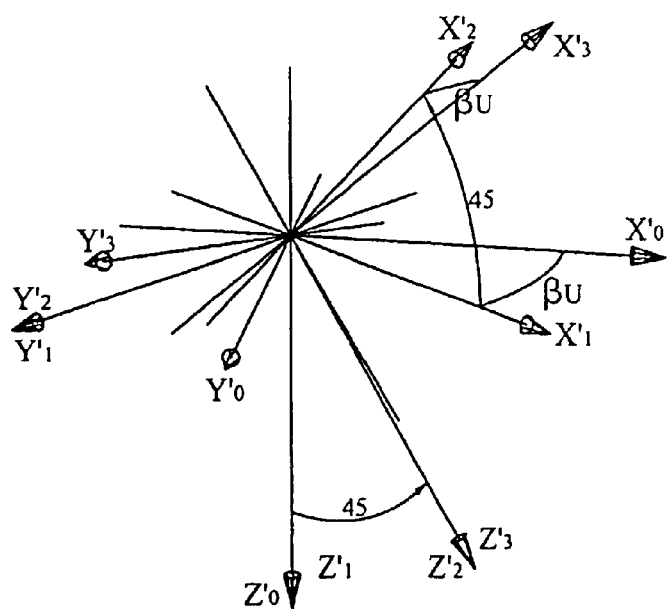

Matrix $T_{Lower}^{Bevel}$ transforms the coordinate system from the lower bay to the bevel gears. But, since the joint is symmetric about the bevel gear, FIGS. 17a and 17b, then the transformation matrix that transforms the upper bay coordinate system to the bevel gears is the same.

Hence, $T_{Upper}^{Bevel} = T_{Lower}^{Bevel}$. But since these matrices are rotation matrices, orthonormal, their inverse is equal to the transpose of the matrix. Hence, $T_{Upper}^{Bevel^{-1}} = T_{Upper}^{Bevel^T} = T_{Lower}^{Bevel^T}$. In order to get the transformation matrix from the lower bay to the upper bay, we must multiply all the matrices. $T_{Lower}{}^{Upper} = T_{Lower}{}^{Bevel^T} \cdot A \cdot T_{Lower}{}^{Bevel}$ where matrix A aligns the axes on the bevel gear by rotating the frame around $oy_3$ or $oy'_3$ by 180 degrees. Let V be a vector that represents the upper bay in the $ox'_0y'_0z'_0$. Then $V' = T_{Lower}{}^{Upper} \cdot V$ where V' is the representation of the upper bay in the lower bay reference frame $ox_0y_0z_0$.

$$A = \begin{bmatrix} -1 & 0 & 0 \\ 0 & 1 & 0 \\ 0 & 0 & -1 \end{bmatrix} \quad V = \begin{bmatrix} V_x \\ V_y \\ V_z \end{bmatrix}$$

If the joint was in straight position then $V = [0\ 0\ 1]^T$. Hence, V' is:

$$V'(\beta_L, \beta_U) = \begin{bmatrix} \frac{1}{2}[\cos^2(\beta_L)\cos(\beta_U) + \sqrt{2}\cos(\beta_U)\sin^2(\beta_L) + \cos(\beta_L)(-1 + (-1+\sqrt{2})\sin(\beta_L)\sin(\beta_U))] \\ \frac{1}{2}[-\sin^2(\beta_L)\sin(\beta_U) - \sqrt{2}\sin(\beta_U)\cos^2(\beta_L) - \sin(\beta_L)(-1 - (-1+\sqrt{2})\cos(\beta_L)\cos(\beta_U))] \\ \cos^2\left(\frac{\beta_L + \beta_U}{2}\right) \end{bmatrix}$$

where $\beta_L$ and $\beta_U$ are the angles of rotation of the lower and upper cup with respect to the lower and upper bay respectively. $\|V'(\beta_L, \beta_U)\| = 1$ for any $\beta_L$ and $\beta_U$. Notice that:

$$V'^+(\beta, \beta) = \begin{bmatrix} V'^+_x \\ V'^+_y \\ V'^+_z \end{bmatrix} = \begin{bmatrix} (1-\sqrt{2})\cos(\beta)\sin(\beta)^2 \\ -\frac{1}{2}(1+\sqrt{2} + (-1+\sqrt{2})\cos(2\beta))\sin(\beta) \\ \cos(\beta)^2 \end{bmatrix} \quad (1)$$

$$V'^+(-\beta, -\beta) = \begin{bmatrix} (1-\sqrt{2})\cos(\beta)\sin(\beta)^2 \\ \frac{1}{2}(1+\sqrt{2} + (-1+\sqrt{2})\cos(2\beta))\sin(\beta) \\ \cos(\beta)^2 \end{bmatrix} = \begin{bmatrix} V'^+_x \\ -V'^+_y \\ V'^+_z \end{bmatrix} \quad (2)$$

$$V'^-(\beta, -\beta) = V'^-(-\beta, \beta) = \begin{bmatrix} 0 \\ 0 \\ 1 \end{bmatrix} \quad (3)$$

Notice that in equations (1) and (2), $\beta_L = \beta, \beta_U = \beta$ or $\beta_L = \beta_U = -\beta$. This means that the motors are spinning in the same direction. $V'^+_z = V'_z(\beta, \beta) = V'_z(-\beta, -\beta) = \cos^2(\beta)$. The elevation angle $\phi$ and the azimuth angle $\theta$ are:

$$\phi = \cos^{-1}\left(\frac{V'^+_z}{\|V'\|}\right) = \cos^{-1}(\cos^2(\beta)),$$

$$\theta = \tan^{-1}\left(\frac{V'^+_y}{V'^+_x}\right) = \tan^{-1}\left(\frac{((-1+\sqrt{2})\cos(2\beta) + \sqrt{2} + 1)\csc(\beta)\sec(\beta)}{2(-1+\sqrt{2})}\right).$$

Figure 18A:
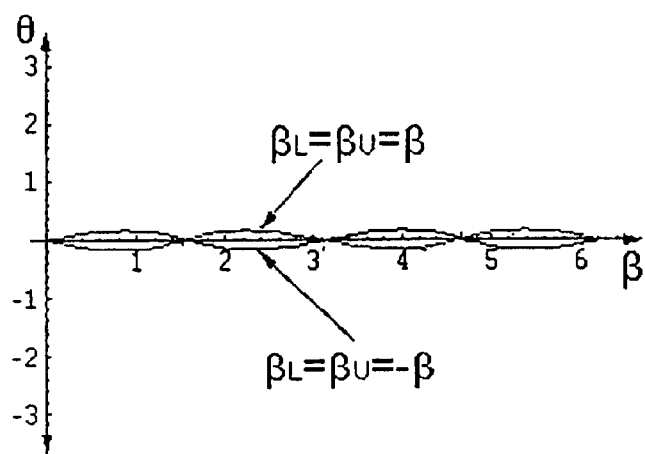
FIGS. 18a and 18b are graphs showing the variation the elevation and azimuth angles.
Figure 18B:
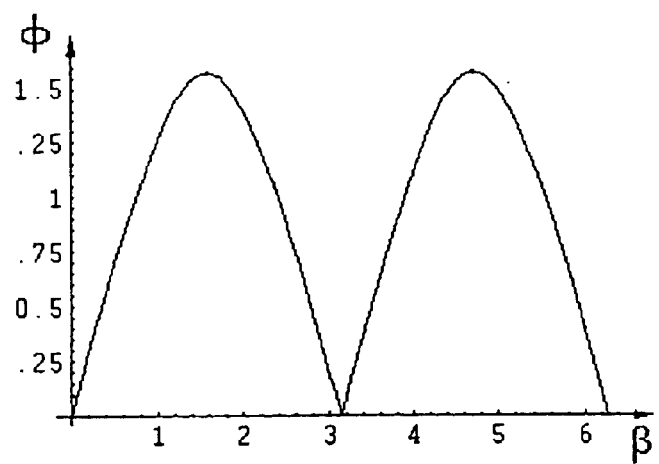
Figure 19A:
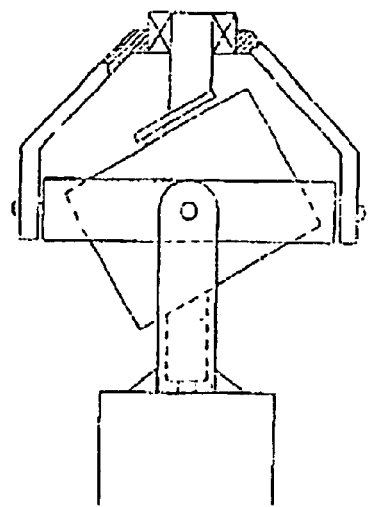
FIGS. 19a and 19b show a prior art snake robot design.
Figure 19B:
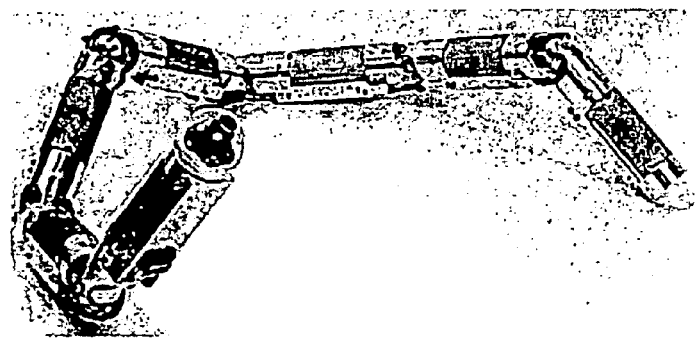
Figure 20A:
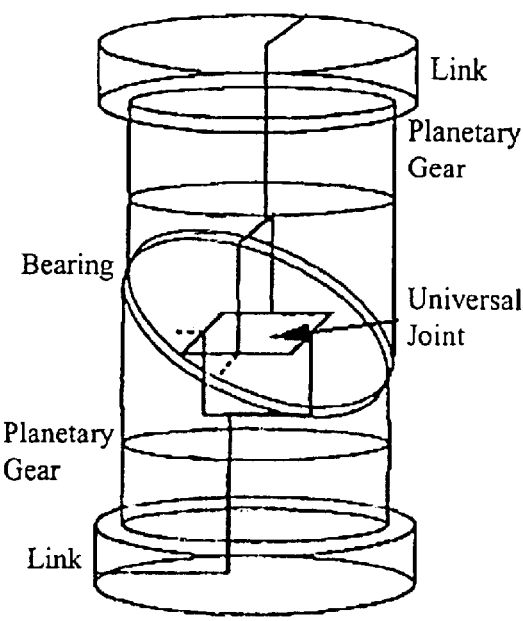
FIGS. 20a and 20b show a prior art serpentine robot.
Figure 20B:
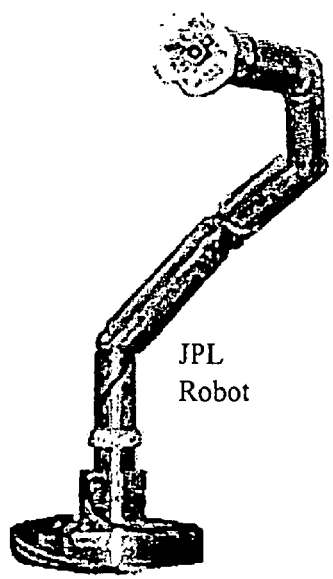
Figure 21A:
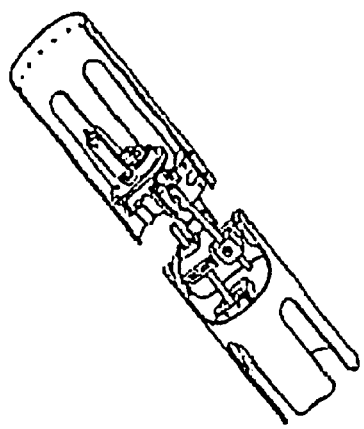
FIGS. 21a and 21b show yet another prior art snake robot designs.
Figure 21B:
Figure 22:
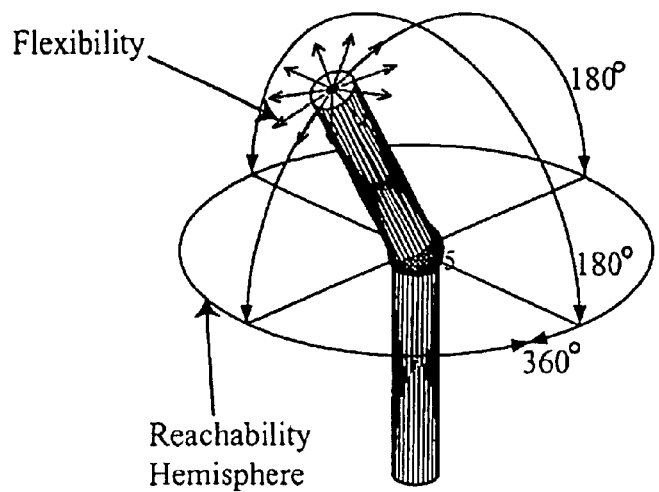
FIG. 22 illustrates the infinite flexibility of a joint in accordance with the present invention.
Figure 23:
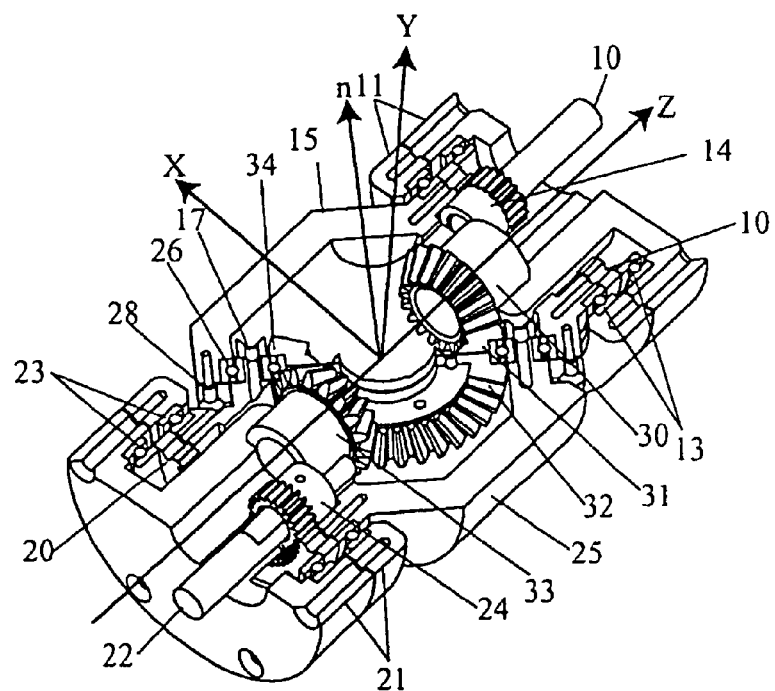
FIG. 23 is a perspective view showing a section of a joint in accordance with a preferred embodiment of the present invention.

FIGS. 18a and 18b show how the elevation $\phi$ and azimuth $\theta$ angles change versus $\beta$. The elevation angle is the same whether $\beta_L = \beta_U = \beta$ or $\beta_L = \beta_U = -\beta$. But the azimuth angle changes sign (FIG. 18a). This means that the joint will start bending in the positive oy direction or the negative oy direction depending on whether $\beta_L = \beta_U = \beta$ or $\beta_L = \beta_U = -\beta$. Moreover, the azimuth angle is very small and almost zero. This means that rotating both motors in the same direction whether in the positive or the negative direction will bend make the joint bend in one plane. Hence the first degree-of-freedom which is in-plane bending.

Assume that the joint is in arbitrary configuration, then $V = [V_x\ V_y\ V_z]^T$. If the motors are spinning in opposite direction this will change the azimuth angle $\theta$. This gives the second degree-of-freedom which is orienting.

From equation (3), where $\beta_L = -\beta_U = \beta$ or $\beta_L = -\beta_U = -\beta$, $V'^- = [0\ 0\ 1]^T$. This proves that if the joint is straight and the motors are spinning in opposite directions, the snake stays upright. So spinning the motors in opposite direction changes the orientation of the bevel gears and rotates both lower and upper cup as one rigid body. Since the cups have a circular profile they could be used as a wheel. This gives the third degree-of-freedom with is rolling.

Having described the invention in connection with certain embodiments thereof, modification will now certainly suggest itself to those skilled in the art. As such, the invention is not to be limited to the disclosed embodiments except as required by the appended claims.

What is claimed is:

1. A robotic joint comprising:
   a first bay having a first bay rotation axis;
   a first cup having a first cup rotation axis, the first cup being rotatably connected to the first bay;
   a second cup having a second cup rotation axis, the second cup being rotatably connected to the first cup
   a second bay having a second bay rotation axis, the second bay being rotatably connected to the second cup; and
   a gear train connected to the first bay and the second bay wherein
      the first bay rotation axis is aligned with the second bay rotation axis;
      the first cup rotation axis and the second cup rotation axis are aligned when the joint is in a straight position; and
      the relative orientation of the first and second bay is preserved when the first cup rotates relative to the second cup.

2. The robotic joint of claim 1, wherein the gear train comprises:
   a first bevel pinion;
   a first bevel gear mating the first bevel pinion;
   a second bevel gear fixedly connected to the first bevel gear; and
   a second bevel pinion mating the second bevel gear;
   wherein the first bevel pinion is fixedly connected to the first bay, and the second bevel pinion is fixedly connected to the second bay.

3. The robotic joint of claim 2, wherein the gear train further comprises a bevel gear bearing having an internal ring and an external ring, the internal ring being fixedly connected to at least one of the first and second bevel gears.

4. The robotic joint of claim 3, wherein the external ring of the bevel gear bearing is fixedly connected to the second cup.

5. The robotic joint of claim 4, wherein
   (a) the first bay and the first cup are rotatably connected with a first pair of bearings, the first pair of bearings having a first pair of internal rings and a first pair of external rings, the first pair of internal rings being fixedly connected to the first cup and the first pair of external rings being fixedly connected to the first bay, whereby the first pair of bearings allow the first bay to rotate relative to the first cup about a common axis of rotation; and
   (b) the second bay and the second cup are rotatably connected with a second pair of bearings, the second pair of bearings having a second pair of internal rings and a second pair of external rings, the second pair of internal rings being fixedly connected to the second cup and the second pair of external rings being fixedly connected to the second bay, whereby the second pair of bearings allow the second bay to rotate relative to the second cup about a common axis of rotation.

6. The robotic joint of claim 5, further comprising:

(a) a first spur gear fixedly connected to the first cup;

(b) a first spur pinion gear mating the first spur gear;

(c) a first motor shaft fixedly connected to the first spur pinion gear and having a common axis of revolution therewith;

(d) a first minor bearing having an internal ring and an external ring, the internal ring being fixedly connected to the first bay;

(e) a second spur gear fixedly connected to the second cup;

(f) a second spur pinion gear mating the second spur gear;

(g) a second motor shaft fixedly connected to the second spur pinion gear and having a common axis of revolution therewith; and (h) a second minor bearing having an internal ring and an external ring, the internal ring being fixedly connected to the second motor shaft, the external ring being fixedly connected to the second bay;

whereby a rotation of the first motor shaft induces a rotation of the first cup with respect to the first bay and a rotation of the second motor shaft induces a rotation of the second cup with respect to the second bay.

7. The robotic joint of claim 1, wherein said first bay rotation axis, first cup rotation axis, second cup rotation axis and second bay rotation axis meet in a single point.

8. A robotic joint comprising:

a first bay;

a first rotatable cup, connected with the first bay;

a second rotatable cup, connected with the first cup; and a second bay connected with the second cup, wherein:

rotation of the first cup without a corresponding rotation of the second cup allows movement of the first bay around a cone;

rotation of the second cup without a corresponding rotation of the first cup allows movement of the second bay around a cone;

rotation of the first cup in a first direction and of the second cup in a second direction same as the first direction allows bending in a plane of the first and second bay; and rotation of the first cup in a first direction and of the second cup in a second direction opposite the first direction allows rotation of the second bay in one direction and corresponding rotation of the first bay in another direction opposite the one direction, thus preserving orientation of the first bay upon rotation of the second bay.

9. The robotic joint of claim 8, further comprising a first and second bevel gear connecting the first cup with the second cup, the first and second bevel gear rotating upon rotation of the first and second cup, respectively.

10. The robotic joint of claim 9, further comprising a first bevel pinion associated with the first bevel gear and a second bevel pinion associated with the second bevel gear.

11. The robotic joint of claim 10, wherein the first bevel pinion, the first bevel gear, the second bevel gear and the second bevel pinion form a gear train.

12. A robotic joint comprising:

a first half assembly including:
a first bay having a first bay rotation axis; and
a first cup having a first cup rotation axis, the first cup being rotatably connected with the first bay;

a second half assembly including
a second bay having a second bay rotation axis; and
a second cup having a second cup rotation axis, the second cup being rotatably connected with the second bay;

the second half assembly meeting the first half assembly on a inclined plane which is inclined with respect to a perpendicular plane perpendicular to the first and second bay rotation axis, wherein:

the first bay rotation axis is aligned with the second bay rotation axis;

the first cup rotation axis and second cup rotation axis are aligned when the joint is in straight position; and a combined rotation of the first half assembly around the first bay rotation axis and the second half assembly around the second bay rotation axis defines either a rotation, in opposite directions, of the first bay and the second bay in a location distal to the inclined plane, or bending in a plane of the first and second bay.

13. The robotic joint of claim 12, wherein the inclined plane has an inclination angle of 45° with respect to the perpendicular plane.

14. The robotic joint of claim 12, wherein the first bay rotation axis, first cup rotation axis, second cup rotation axis, second bay rotation axis meet in a single point.

15. A robot including a robotic joint, the robotic joint comprising:

a first bay;
a first rotatable cup, connected with the first bay;
a second rotatable cup, connected with the first cup; and
a second bay connected with the second cup, wherein:

rotation of the first cup without a corresponding rotation of the second cup allows movement of the first bay around a cone;

rotation of the second cup without a corresponding rotation of the first cup allows movement of the second bay around a cone;

rotation of the first cup in a first direction and of the second cup in a second direction same as the first direction allows bending in a plane of the first and second bay; and rotation of the first cup in a first direction and of the second cup in a second direction opposite the first direction allows rotation of the second bay in one direction and corresponding rotation of the first bay in another direction opposite the one direction, thus preserving orientation of the first bay upon rotation of the second bay.

16. A robot according to claim 15, wherein the robot is a snake robot.

* * * * *